United States Patent [19]

Norton

[11] 4,088,723
[45] May 9, 1978

[54] METHOD OF PREPARING HONEYCOMB INSULATION STRUCTURE

[75] Inventor: Richard V. Norton, Wilmington, Del.

[73] Assignee: Suntech, Inc., Wayne, Pa.

[21] Appl. No.: 661,907

[22] Filed: Feb. 26, 1976

Related U.S. Application Data

[63] Continuation-in-part of Ser. No. 500,966, Aug. 26, 1974, abandoned.

[51] Int. Cl.² .................. B29D 3/02; B29D 27/04
[52] U.S. Cl. .................... 264/45.5; 264/46.6; 264/46.7; 264/221; 264/225; 264/267; 264/275; 264/279; 264/298
[58] Field of Search ............ 264/46.4, 46.6, 46.7, 264/45.5, DIG. 14, 261, 267, 259, 275, 264, 294, 298, 45.8, 46.2, 46.3, 317, 221, 225, 275, 279; 420/116–118

[56] References Cited

U.S. PATENT DOCUMENTS

| | | | |
|---|---|---|---|
| 3,064,345 | 11/1962 | Herman et al. | 264/278 |
| 3,407,110 | 10/1968 | Axelson et al. | 264/46.7 |
| 3,425,885 | 2/1969 | Webb | 428/116 |
| 3,543,315 | 12/1970 | Hoffman | 428/116 |
| 3,555,131 | 1/1971 | Weismann | 264/46.7 |
| 3,751,534 | 8/1973 | Oxley | 264/45.5 |

OTHER PUBLICATIONS

Zwolinski, Molded Integral Skin Urethane Foam, SPE Jour. vol. 25, 1969 pp. 24–27.

*Primary Examiner*—Willard E. Hoag
*Attorney, Agent, or Firm*—J. Edward Hess; Donald R. Johnson; Anthony Potts, Jr.

[57] ABSTRACT

Method is disclosed for preparing a honeycomb insulation structure having its cells partially filled with a low density foam and a high density integral skin completely covering one edge of the honeycomb. Method comprises placing one edge of a honeycomb in an inert material; introducing a foamable or foaming substance into the cells and allowing it to rise from the surface of the inert material until it overflows slightly. The overflowing foam comes into contact with a pressure platen just above the honeycomb thereby forming the high density integral skin. The level of the material in the cell determines the thickness of the void on one edge. Structure has utility in cryogenic storage.

4 Claims, 3 Drawing Figures

U.S.Patent    May 9, 1978    4,088,723

METHOD OF PREPARING HONEYCOMB INSULATION STRUCTURE

CROSS REFERENCE TO RELATED APPLICATION

This application is a continuation-in-part of Ser. No. 500,966, filed Aug. 26, 1974 now abandoned.

BACKGROUND OF THE INVENTION

This invention relates to a method of preparing a structure having utility in the storage or transport of liquids at temperatures greatly differing from ambient temperature. The structure is primarily intended for enclosing cryogenic liquids, such as liquefied gases at about atmospheric pressure. It is used in conjunction with other materials such as aluminum for containers for cold liquids, for example liquefied gases, such as liquefied natural gas and more particularly liquid hydrogen, argon, propane and butane. Such containers are used, for example in marine tankers, for the transport of liquefied gases. A more detailed discussion of such containers is contained in a report to the Maritime Administration, U.S. Department of Commerce, entitled "LNG Containment Systems", May 1972, Contract MA-6562.

It is known that use of a hexagonal honeycomb wherein empty cells are filled with an insulating foam, provide a structurally intact cryogenic insulation having the utility heretofore disclosed; see U.S. Pat. No. 3,556,917, issued Feb. 14, 1966 to B. E. Eakin et al. (Class 161-44). Furthermore, U.S. Pat. No. 2,744,024, issued May 1, 1956 to H. A. Pace (Class 154-75) teaches the fabrication of such a honeycomb by the introduction of a foamable material into empty cells of the honeycomb and allowing the material to rise in the cells to fill them. Also properties of foams, such as polyurethanes, are known; see POLYURETHANES Chemistry, Technology and Properties, L. N. Phillips and D. B. V. Parker, London, Iliffe Books Ltd.

Also, U.S. Pat. No. 3,064,345, issued Nov. 20, 1962 to V. L. Herman et al. discloses immersing a honeycomb structure into a bath containing a heated liquid. The liquid consists of two layers. The top layer is a material which is solid at room temperature. It floats on a bottom layer which has a density greater than that of the material floating on top and which is a liquid at room temperature. After the structure, one open edge, settles to the bottom of the bath, the bath is allowed to cool to room temperature. Upon cooling the top layer solidifies against the edge surface of the honeycomb. After removal of the structure from the bath the honeycomb is modified in that a substantially rigid, airtight material is in contact with it. Because it is airtight a vacuum applied to one side of the hoenycomb holds it in place thereby permitting the honeycomb to be worked upon. After working the honeycomb the solid material, e.g., polyglycol, can be removed by contacting it with water. U.S. Pat. No. 3,555,131, issued Jan. 12, 1971, to V. P. Weismann, discloses placing an empty lattice in a form containing water. A quantity of membrane-forming liquid is poured onto the surface of the water. The liquid spreads over the water and forms a thin membrane. After the membrane is formed a desired amount of liquid foam material is added thereon. After the foam sets, the combination of lattice and solid foam are lifted from the form. The membrane adheres to the foam surface and acts as a moisture barrier. The resulting product is a reinforced modular foam panel. U.S. Pat. No. 3,274,322, issued Sept. 20, 1966, to J. S. Scudder, discloses placing a liquid layer of polyurethane onto a moving surface. The moving surface that contacts the polyurethane has on it an oily substance. The oily substance reduces sticking between the moving surface and the polyurethane. U.S. Pat. No. 3,187,069, issued June 1, 1975, to S. Pincus et al., discloses a method of making molded foamed articles in which a mold is lined with an easily removable plastic film. Liquid foam is placed into a mold so lined. The mold is closed until the expansion of the foam is complete. However, before curing of the foam is complete the mold is opened and the film surrounded foamed article is removed. The removed liner surrounded article is then heated at a curing temperature. A result of this method is that the mold itself is not heated to a deleterious curing temperature.

However, the aforementioned honeycomb insulation generally does not have the inherent tensile shear property to resist fracturing at cryogenic temperatures. The fracturing results from the thermal stresses imposed on the honeycomb from having a cryogenic liquid on one side and normal ambient conditions on the other side. Additionally, the side of the honeycomb not facing the cryogenic liquid does not provide a detection space when bonded directly to a supporting means. Therefore it does not offer any means for determining or monitoring the integrity of the primary skin against liquid intrusion.

Thus, in the practice of this invention, present method fabricates a honeycomb which overcomes the previously mentioned problems, i.e., the fracturing and lack of means for monitoring.

SUMMARY OF THE INVENTION

Disclosed method results in a honeycomb insulation structure having its cells partially filled with a low density foam and a high density integral skin completely covering one edge of the honeycomb. The honeycomb insulating structure is prepared by placing one edge of an unfilled honeycomb down in an inert material. The level of the material within the unfilled cells of the honeycomb determines the amount of void. Also, a pressure platen is maintained just above the honeycomb edge not immersed in the inert material. Then a foamable or foaming substance is introduced into the cells of the honeycomb. The foamable substance can be foamed in situ. As the foaming substance rises from the surface of the inert material it fills the cells of the honeycomb and overflows slightly coming in contact with the platen. By contacting the platen the overflowing foam forms an apparently smooth surface and a higher density foam completely covering the other edge of the honeycomb. After the foam stabilizes the filled honeycomb is removed from the inert material.

The resulting structure is one which has a void along the edge that was placed in the inert material. The thickness of this void is determined by the level of the material at the time the foaming substance stabilizes. This void provides a gas leakage detection pace when the hoenycomb is attached directly to a supporting means. Also, the structure has an integral skin of high density completely covering the other edge of the honeycomb. This integral skin has a high tensile and shear strength suitable for directly contacting cryogenic liquids. Because of the control of the pressures, if necessary, on the inert material and the platen and other operating variables, the foam forms a liquid-tight fit within the cell. Also the foam within the cell has a density gradient that increases as the integral skin is approached.

DESCRIPTION OF THE INVENTION

Figure 1:
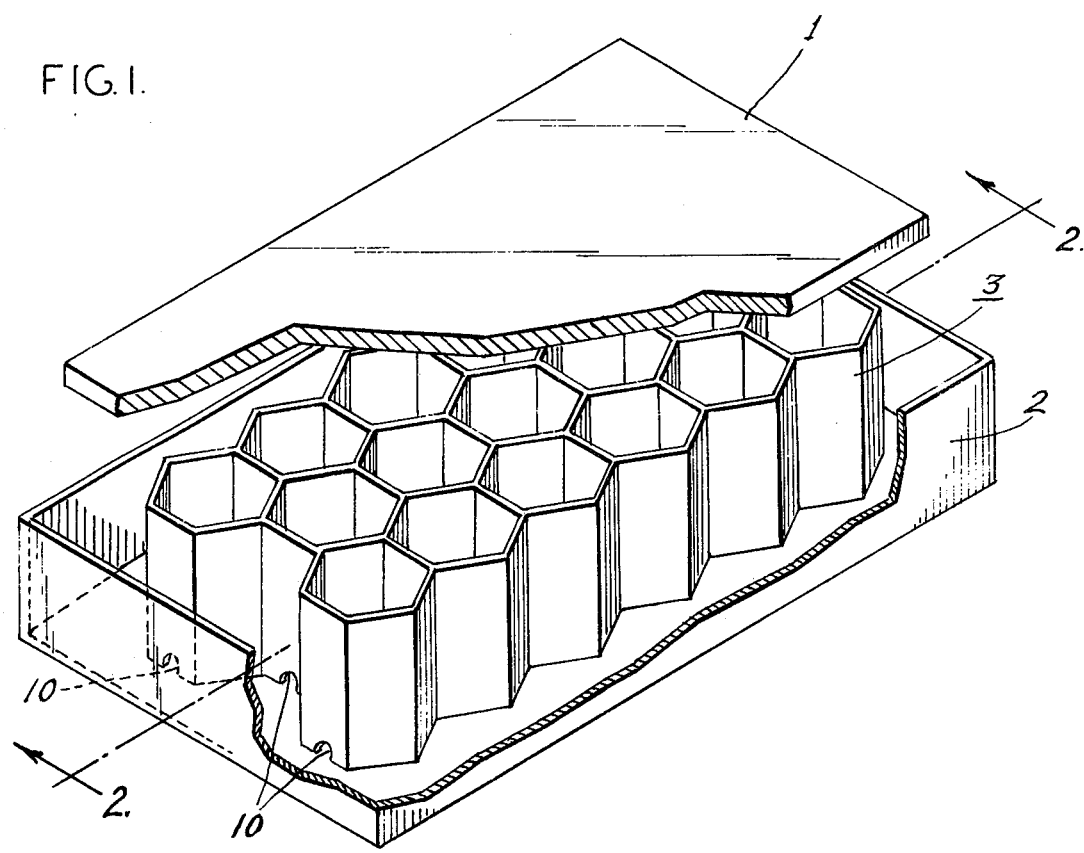
FIG. 1 is a perspective, partially cutaway view of empty honeycomb structure and apparatus that could be used according to this invention.

Honeycomb type spacers can be prepared according to one of the generally accepted practices. For example, strips of material can be spot-glued, expanded to the desired honeycomb structure, and held in flexed position by resin impregnation. Alternatively, they may be molded from resin-impregnated materials or they may be constructed by shaping flat sheets on a mandrel. Impregnated paper, impregnated cloth woven from glass fibers, shaped aluminum and other similar materials may be employed in preparing the honeycomb spacers used in practicing this invention. The size of the open-ended cells of the honeycomb is not critical but a reasonable proportion between the size of the cell and the size of the finished product should be maintained. For example, the transverse ribs may divide the structure into any number of cells between two and such a multitude as to unduly restrain the rise of the foam. Both of these extremes should be avoided. Typically the honeycomb is hexagonal, however, other polygons are usable.

Additionally the honeycomb structure could be notched so that the honeycomb has interconnecting holes to provide continuity between the unfilled portion of the cells. The interconnecting holes could be used for as an example gas sampling or temperature measurements.

The foamable substance should be interiorly cohesive. Such foamable materials are disclosed in detail in Kirk-Othmer, ENCYCLOPEDIA OF CHEMICAL TECHNOLOGY, Volume 9, Second Edition, pages 847–884. Types of polymers which can be foamed include cellulose acetate, epoxy resin, phenolic resin, polyethylene, polystyrene, silicones, urea-formaldehyde resin, urethane polymers, latex foam rubber, natural rubber, synthetic elastomers, polyvinyl chloride and ebonite. Methods of producing the foamable materials, which are also known as foamed plastics or cellular polymers, including expandable formulation, extrusion, spray, froth foam, compression mold, injection mold, sintering and leaching; all of said methods are described in said encyclopedia. Resulting physical and chemical properties of the foam are also given. Of particular preference of preparing the foam is the chemical stabilization process of which the production of polyurethane foams is typical.

Also, the foamable or foaming substance cannot adversely react with the material used to create the void in the completed honeycomb insulation. This material is referred to as an inert material. Inert as used herein refers to both chemical and physical properties. Furthermore, inert indicates that the material used to create the void does not adversely change the properties of the solid portion of the honeycomb often referred to as the spacers. The inert material could be a liquid such as an aliphatic hydrocarbon, such as hexane, pentane, octane, isooctane; higher molecular weight hydrocarbons such as mineral oil. Depending on the foamable substance other liquids such as water, alcohol and other organics, and mercury, could be suitable. The material could also be a solid such as a wax, sand, clay, rubber, polymer and similar materials. With wax for example, one open end side of the honeycomb is set in molten wax, the cells filled with foam, and if the wax hardens, the product can be warmed to release the wax, if necessary. The inert material could be a solid surface, such as metal, stone, glass or polymer, containing grooves. The grooves would match the open end design of the honeycomb; their depth would determine the amount of void; their width would fit sufficiently snug with the thickness of the spacers to prevent leakage of the foaming substance. Inert liquids are preferable because of ease of handling. If an inert liquid is used any residual can be removed from the structure by known means. Solids, such as sand, that can be easily penetrated are also preferred.

Figure 2:
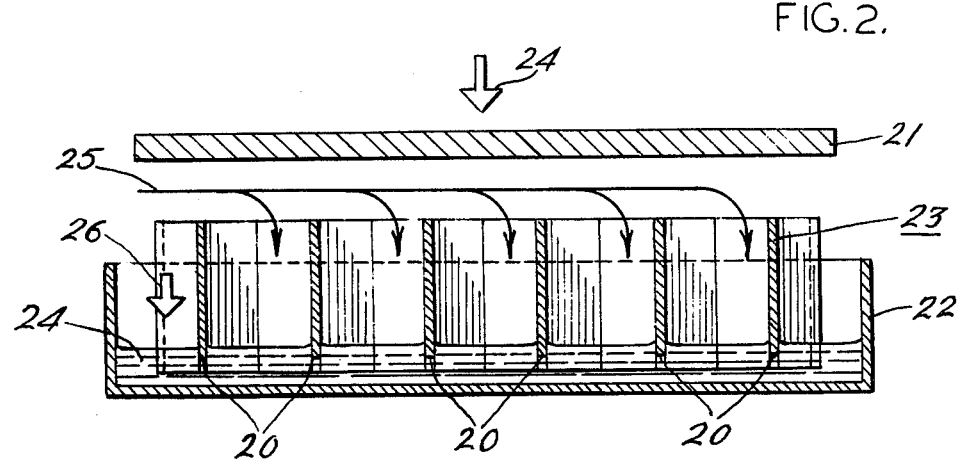
FIG. 2 is a partial sectional view of FIG. 1 taken along line 2—2.

As stated heretofore, FIG. 1 is a perspective cutaway view of the empty honeycomb and the apparatus that could be used according to this invention. Empty honeycomb 3 is positioned, in this example, in a tray 2 which is shown as not containing an inert material. Above the honeycomb 3 and tray 2 is a pressure platen 1. The notch 10 on one edge of the honeycomb structure 3 provides the means for continuity between the voids of the cells. Inert liquid 24 shown in FIG. 2 is not shown in FIG. 1. FIG. 2 is a sectional view of FIG. 1 taken along line 2—2.

FIG. 2 lends itself to a discussion of one procedure that could be used according to this invention. One open ended edge of the honeycomb 23 is placed in the liquid 24 in tray 22. The open ended edge of the honeycomb can be in contact with the bottom of tray 22, but as shown in FIG. 2 it does not. Into the emtpy cells of the honeycomb 23 the foamable or foaming substance 25 (not shown) is introduced. A frothing substance, which is either the introduced foaming substance or the foamable substance foaming in situ, rises within the empty cells until it comes into contact with the pressure platen 21. The distance between the platen 21 and the edge of the honeycomb 23 is a variable depending on the type of polymer, the desired density of the foam, and operating conditions such as temperature. The platen 21, as well as the pressure 26 applied to the liquid, can be continuously adjusted so as to equalize the forces involved thereby preventing any shearing motion in the lower portion of the foam. Pressure 24 on the platen 21 counterbalances the force exerted by the rising foam (not shown) within the cells and at the same time pressure 26 maintains the level of the liquid within the cells despite the force exerted by the expanding foam. Pressure 24 can be created by many means such as applying air pressure. While not shown mechanical means can also be used. Because of the downward force exerted by the platen the expanding foam also exerts a downwardly force on the liquid which would reduce its level accordingly unless counterbalanced by force 26. An alternative would be to allow a controlled amount of displacement of the inert liquid but the objective is still to obtain the desired size of void.

As the overflowing foam contacts the platen 21 it spreads sideways covering the upper edge of the honeycomb 23. The net result of all of the pressures, i.e., 24, 26 and that exerted by the foam causes the density of the foam within the cell to vary. The density gradient of the foam will increase rapidly the closer it approaches the platen 21. Also, contacting of the platen 21 having a smooth surface by the foam causes an integral surface to be formed on the surface of the foam. After the foamed substance is stabilized the now filled honeycomb can be removed from the tray 22.

Figure 3:
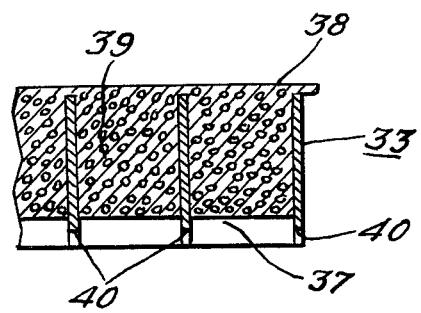
FIG. 3 is a cutaway view of a portion of honeycomb filled with foamed material, said view taken along line 2—2.

A partial cutaway portion of the resulting insulating structure is shown in FIG. 3. Shown in this figure are the following: the stabilized foam 39 that fills the cells of the honeycomb 33; the void 37 caused by the presence of the inert liquid occupying a portion of the cell during foaming; the integral surface 38; one result of the foam overflowing is the lip seen at the right side of the outermost edge; the interconnecting channel or notch 40 which allows continuity between cells for gas sampling and other monitoring requirements. The heretofore mentioned lip could be removed before final attachment to a tank.

Alternatively, the mixed but not yet foaming substance could be placed uniformly over the surface of the inert liquid 24. Subsequently the honeycomb is placed through the aforementioned substance and the inert liquid 24 to a desired depth. This alternative can eliminate the sometimes difficult task of uniformly filling the cells of the honeycomb with the foamable substance. A variation of the foregoing would be that the substance is foaming when the honeycomb is placed through the foaming substance and inert material.

The density of the foam is not constant throughout. Generally the foam within a majority of the cell has a density between from about 2 pounds per cubic foot to about 20 pounds per cubic foot. And generally the foam making up the high density integral skin has a density between from about 20 pounds per cubic foot to about 80 pounds per cubic foot. A preferred density for the skin is between about 30 to about 60 pounds per cubic foot. Between the high density integral skin and most of the foam in the cell is a zone of rapidly changing density. This transistion zone has a density that changes rapidly from the low density of most of the foam in the cell to high density of the integral skin. This is not to say that the density within the skin or the foam in most of the cell does not vary; on the contrary it does. But in this transistion zone the change in density is relatively rapid compared to the changes elsewhere.

The following are comparative examples demonstrating that applicant's method produces a better insulating honeycomb structure.

EXAMPLES

The following examples describe how three different insulating honeycomb structures were prepared and how two structures have deficiencies compared to the third prepared by applicant's method.

In the first comparative example foaming polyurethane was introduced into the cells of a honeycomb structure which had one of its open edges inserted in a bath of molten low molecular weight polyethylene wax. The amount of the foam was such that the foam filled the cells to the other edge. In other words when the foam stabilized the edges of the honeycomb structure were still visible. The resulting polyurethane filled honeycomb structure was removed from the polyethylene wax by warming. Afterwards liquid nitrogen was poured on the face of the structure, but the foam contracted, broke away from the honeycomb and the liquid ran down the walls of the honeycomb and came out the other side.

In the second comparative example foaming polyurethane was introduced into the compartments of a honeycomb structure which had one of its open edges inserted in the polyethylene wax bath as above. The amount of the foam was such that the foam just filled the cells to the other edge. Then a liquid polyurethane elastomer was spread over the foam within the honeycomb and the edges of the honeycomb. The liquid solidified and cured and it formed an integral skin completely covering the foam and edges. The structure was removed from the inert polyethylene wax by heating. Afterwards liquid nitrogen was poured on the integral skin. But the integral skin cracked wherever it contacted the edges of the sides of the honeycomb thereby making the product unsatisfactory as an cryogenic and liquid barrier to liquified gases such as methane.

In the example demonstrating applicant's method foaming polyurethane was introduced into the cells of a honeycomb structure which had one of its open edges inserted in the polyethylene wax. The amount of the foam was such that it overflowed the edges of the cells. Located above the honeycomb was a pressure platen which was located about ¼ inch from the honeycomb. Thus as the foam overflowed it came in contact with the platen which offered resistance to the foaming. This resistance caused the formation of a high density integral skin about ¼ inch thick. The density of this skin was about 30-40 pounds per cubic foot whereas the density of the foam within the cells was about 4-6 pounds per cubic foot. Between these two densities was a zone where the densities rapidly increased. In this example the level of the inert material was higher when the foaming polyurethane was introduced than when the foam stabilized. In other words when the pressure platen contacted the overflowing polyurethane foam it resisted the foam forward motion. This resistance in turn was transmitted down to the inert polyethylene wax and caused some of it to move out of the cells. By allowing for such movement the thickness of the void can be controlled. The resulting honeycomb, after the foam stabilized, was removed from the inert material.

Afterwards liquid nitrogen was poured on the high density integral skin. No cracks appeared generally on the skin and in particular none appeared where the skin contacted the edges of the sides of the honeycomb. Thus the resulting product was a highly satisfactory cryogenic insulating structure and provided cryogenic liquid barrier properties for use as a storage tank.

Analogous results will be obtained when the inert material is a mineral oil or one of other liquids heretofore mentioned or a wax or one of the heretofore mentioned solids. When other foaming substances or foamable substances such as cellulose acetate, epoxy resin, phenolic resins, polyethylene, polystyrene, silicones, latex foam rubber, polyvinyl chloride and the like are used similar results will be obtained. And when the inert material is held in place by various means such as air pressure or a mechanical device equally analogous results will be obtained.

The invention claimed is:

1. The method of preparing a honeycomb insulation structure comprising:
   (a) introducing a foamable or foaming substance, into cells of a honeycomb having one of its open-end edges in a chemically and physically inert material whereby the resulting honeycomb insulation structure has a void along its open-end edge and thickness of the void is determined by the level of the inert material at the time the substance stabilizes;

(b) foaming said substance to fill said cells to overflowing with foam, and contacting an upper surface of said foam with a pressure platen spaced above an open end of said honeycomb;

(c) controlling said thickness by permitting some of said inert material to be displaced from said honeycomb;

(d) maintaining the pressure platen spaced above said honeycomb and stabilizing said foam, whereby a high density integral skin is formed on said foam, said skin having a density between about 20 pounds per cubic foot and the foam within a majority of the cells has a density between about two pounds per cubic foot and about twenty pounds per cubic foot; and (e) separating the inert material from the honeycomb and stabilized foam.

2. Method according to claim 1 wherein the high density integral skin has a density between from about 30 to about 60 pounds per cubic inch and the foam within the majority of the cell has a density between from about 5 to about 10 pounds per cubic foot.

3. Method according to claim 1 wherein the foamable or foaming substance is polyurethane.

4. Method according to claim 3 wherein the inert material is low molecular weight polyethylene wax.

* * * * *